L. LANGHAAR.
BALL BEARING.
APPLICATION FILED JUNE 26, 1920.

1,423,666.

Patented July 25, 1922.

INVENTOR
Louis Langhaar,
by Arthur B Jenkins,
ATTORNEY

UNITED STATES PATENT OFFICE.

LOUIS LANGHAAR, OF CINCINNATI, OHIO.

BALL BEARING.

1,423,666.  Specification of Letters Patent.  Patented July 25, 1922.

Application filed June 26, 1920. Serial No. 391,938.

*To all whom it may concern:*

Be it known that I, LOUIS LANGHAAR, a citizen of the United States, and a resident of Cincinnati, in the county of Hamilton and State of Ohio, have invented a new and Improved Ball Bearing, of which the following is a specification.

My invention relates to the class of devices employed to reduce friction between rotating members and especially shafts, and an object of my invention, among others, is to provide a device of this class that shall be extremely durable, particularly effective, and especially one that may be run at high speed.

One form of bearing embodying my invention and in the construction and use of which the objects herein set out, as well as others, may be attained, is illustrated in the accompanying drawings, in which—

Figure 1:
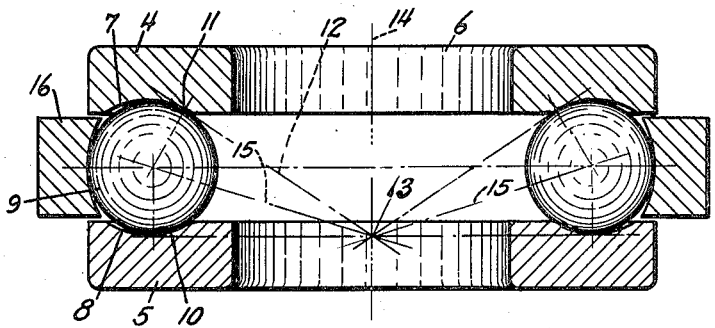
Figure 1 is a view in central section through a thrust bearing embodying my invention.

The structures shown in the drawings are round when viewed in line with the shaft axis.

The purpose of my invention is to provide a ball bearing intended principally for thrust loads, that is, loads supported lengthwise of a shaft, and which bearing may be operated at extremely high rates of speed and with great specific loads, and which bearing is also not restricted in ball size.

By specific loads I mean the load on a ball of any definite size based on the fact that the dead load capacity of a ball increases very rapidly in proportion to any increase of size of the ball. A ball of a material suitable for ball bearings, such as hardened steel, is elastic and deforms under load to a degree proportional to its strength. Therefore as a spot on a large ball is flatter than the same size spot on a smaller ball the larger ball affords more supporting surface under load and carries more load without damaging the structure of its surface.

Therefore, the larger the balls, consistent with the general design of a bearing which comprises such balls, the more effective and durable will be the bearing. It is evident that the ball axis of the balls in any ball bearing, to sustain any degree of thrust, must be located at some angle to the shaft axis and cannot be parallel thereto.

The nearer the approach to pure rolling contact between the balls and their races the nearer will be the approach to a perfect ball bearing. It is a fact that the ordinary two point collar ball bearing of commerce is not arranged to cause the balls to roll correctly but that they spin and grind in the races much to the detriment of the bearing and to its durability, owing to the fact that the tangents to the balls at their bearing points on the bearing members are too near a right angle to the axis of the shaft.

Now in order to closely approach this pure rolling contact of the balls in a ball bearing my invention contemplates that the common tangents of the balls and races at their points of contact on opposite sides of the shaft shall converge substantially at a point in the shaft axis, as shown in the drawings herein illustrating devices embodying my invention and in which the numerals 4—5 indicate the upper and lower bearing members of a ball bearing having the usual openings 6 to receive a shaft in a manner that will be readily understood. Ball races 7—8 are formed in said members, in the device illustrated in Figure 1 these races being curved to a degree slightly greater than the curvature of the balls 9. These balls are caused to make contact with the ball races at spots 10—11, the tangents 12 to which spots meet at 13 in the shaft axis 14, this point 13 being located on a line 15 representing the axis of each ball, and which point is located at one side of a plane passing diametrically through the balls on opposite sides of the shaft. The word "spot" is used herein to designate a very minute area of contact and as distinguished from the word "point" when taken in its strictest sense. The angle between said tangents to any one ball in my improved bearing represents the degree of error in locating the tangents to a ball bearing parallel to each other, provided the balls in the latter case are the same size and are arranged on the same fixed line as in the former case.

By thus arranging the balls and their races I am enabled, by the practice of my invention, to increase the size of the balls for the purpose of increasing the load capacity and without increasing the rate of spinning and grinding, as no matter what may be the size of the balls, this spinning and grinding in my improved bearing is practically zero for all practical purposes. Therefore, there is no practical restriction as to ball size in my improved thrust bearing which is adapted for any practical range of load.

In that type of ball thrust bearing having the tangents to the balls normally parallel, such parallel condition is caused by the law of balance of forces, and, conversely, in my improved bearing the same law causes a reaction of the balls outwardly from the shaft axis due to the convergence of the tangents.

Therefore, to balance this reaction and to retain the balls in their correct positions at the points hereinbefore specified to maintain conical convergence of the tangents, I use a separate circumscribing annulus 16 in contact with the balls and of such internal diameter that it retains the balls on the desired pitch circle. The means of retaining or locating said annulus lengthwise of its axis, which axis is the same as the shaft axis, is immaterial, and the cross sectional contour of the inner surface of such annulus is also immaterial so far as it pertains to the present invention, that is, the said contour may be straight or curved or any shape desired. It is merely sufficient that said annulus is a separate member adapted for independent rotation relative to either of the ball races or of any other part. In the form of device shown in Figure 1 this annulus is retained from vertical displacement by reason of its curved surface in contact with the balls, as will be readily understood.

It is further pointed out that an essential feature of high duty ball bearings comprises ball tracks of curved cross section having a radius of curvature slightly greater than the balls, and I include this as one feature of my invention, in combination. The location of the centers of curvature of such ball tracks are essentially different in my improved thrust bearing than in older types and herein the difference lies. In an ordinary "two-point" thrust bearing, which term "two-point" defines a ball bearing in which each ball is limited to two places of contact with the races, the centers of curvature of the races and the ball center lie normally in one straight line connecting both places of contact, on each ball, that is, in a diametral line of the ball. In such a bearing, at speed, the tangents undoubtedly become outwardly convergent due to centrifugal force on the balls, which is an even greater violation of the conditions of true rolling than in the normal static condition of the bearing; and, of course, the ball centers and race curvature centers would not be in one straight line under such abnormal conditions. This might be defined as the normal speed condition of such an incorrect bearing, but, I restrict the word normal to apply to static conditions for purposes of definition.

The laws of geometry and of forces require that the center of curvature of each race, respectively, shall lie in the line of the radius of the ball at right angles to the common tangent to the ball and the race, and on such radius extended past the ball center. It may, therefore, be seen that in my improved construction, the two spots of contact of each ball and the ball center of that ball normally form the points of a triangle, which is an essential and radical difference from earlier constructions; and, moreover, this normal condition does not change at speed, which is another radical difference.

My improved bearing embodies a circumscribing annulus that touches each ball to one side of the extremity of each ball axis, which thereby imparts a rolling contact between each ball and said annulus, somewhat slower than the relative motion between each ball and the races; though I do not restrict my improvement solely to such a rolling contact between the balls and the circumscribing annulus.

Any convenient form of ball separator may be employed without affecting the spirit of the invention.

Figure 2:
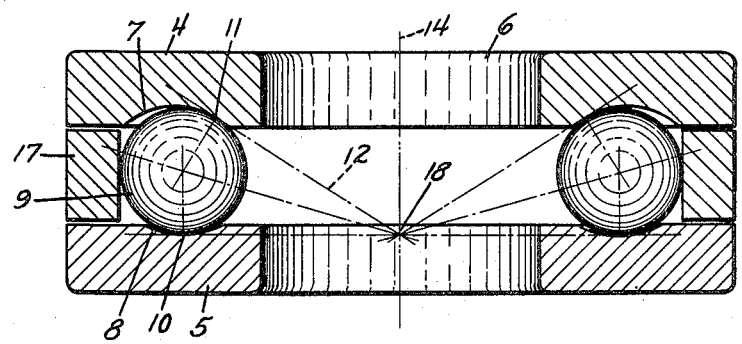
Figure 2 is a view similar to Figure 1 showing a slightly different arrangement of the bearing points.

In the form of the device shown in Figure 2 the contacting surfaces between the annulus 17 and the balls is straight, instead of curved as in Figure 1 but otherwise the essential features are the same as hereinbefore described.

Figure 3:
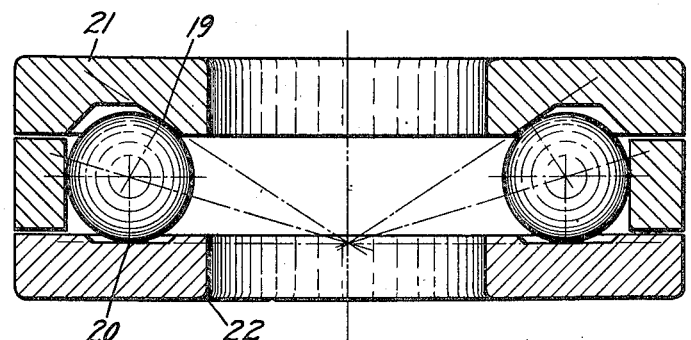
Figure 3 is a view similar to Figure 1 but showing a little different form of bearing points.

In the form of the device illustrated in Figure 3 the conditions as to the meeting points of the tangents are the same as in Figure 2, but the points of contact 19—20 of the balls on the bearing members 21—22 are straight instead of curved as in the other two figures.

In accordance with the provisions of the patent statutes I have described the principles of operation of my invention, together with the device which I now consider to represent the best embodiment thereof; but I desire to have it understood that the device shown is only illustrative, and that the invention may be carried out by other means.

I claim:—

1. A ball thrust bearing comprising a row of balls, two opposed ball races each having a single spot of contact with each ball, and means for retaining the balls to travel on said races with their axes extending substantially through the apex of a cone formed by the tangents of the balls at their points of contact with the ball races and with such tangents in the axis of the bearing at one side of a plane passing diametrically through the balls on opposite sides of said axis of the bearing.

2. A ball thrust bearing comprising a row of balls, two opposed ball races each having a single spot of contact with each ball and having ball tracks of curved cross section, and means for retaining the balls to travel on said races with their axes extending substantially through the apex of a cone formed by the tangents of the balls at their points of contact with the ball races and with such tangents in the axis of the bearing at one side of a plane passing diametrically through the balls on opposite sides of said axis of the bearing.

3. A ball thrust bearing comprising a row of balls, two opposed ball races each having a single spot of contact with each ball, and means for retaining the balls to travel on said races with their axes extending substantially through the apex of a cone formed by the tangents of the balls at their points of contact with the ball races and in the axis of the bearing at one side of a plane passing diametrically through balls on the opposite sides of said axis of the bearing, said retaining means having contact with the balls at a spot removed from the axis of the balls.

4. A ball thrust bearing comprising a row of balls, two opposed ball races each having a single spot of contact with each ball and at least one of said races having a ball track of curved cross section, and means for restraining the balls to travel on said races with their axes and the common tangents to said balls and races converging towards a point in the axis of the bearing at one side of a plane passing diametrically through the balls on opposite sides of said axis of the bearing.

LOUIS LANGHAAR.